United States Patent Office 3,318,918
Patented May 9, 1967

3,318,918
STEROIDAL TERTIARY ETHER GLYCOLS AND
PREPARATION THEREOF
Irving Scheer, Somerville, N.J., assignor to Ortho Pharmaceutical Corporation, a corporation of New Jersey
No Drawing. Filed Aug. 17, 1964, Ser. No. 390,210
9 Claims. (Cl. 260—397.2)

The present invention relates to new steroidal tertiary ether glycols and to methods of preparing steroidal tertiary ether glycols.

A standard tool of the organic chemist in reactions of compound containing a carbonyl group is the protective cyclic ketalization of the carbonyl group during operation on other functions present under non-acidic conditions since the cyclic ketal is generally considered to be among the most unreactive groups. Following the desired reaction, the cyclic ketal is regenerated to the original carbonyl by hydrolysis with a dilute mineral acid. This protective use of the cyclic ketal is described in Advanced Organic Chemistry, Fieser & Fieser (1961), p. 443. The nonreactiveness of the cyclic ketal group with respect to Grignard reagents has been commented on in Steroid Reactions, Djerassi (1963), p. 2 and in U.S. Patent 2,853,496.

The steroidal tertiary ether glycols of this invention may be transformed into other compounds due to the presence of a reactive hydroxyl group, and they are, therefore, valuable as intermediates. The new compounds of this invention possess anti-microbial and spermicidal activity.

It is an object of the present invention to provide novel steroidal tertiary ether glycols.

It is a further object of the invention to provide a novel reaction of steroids having cyclic ketal groups with Grignard reagents.

Further objects will be apparent from the detailed description of the invention hereinafter provided.

In accordance with the present invention, it has been found that a cyclic ketal group at one or more of the positions of a steroid is opened by reaction with a Grignard to form the steroidal tertiary ether glycol.

The carbonyl group generally can be readily converted to a cyclic ketal. A typical reaction for preparing a cyclic ketal is as follows:

One-half mol of a carbonyl compound, three-quarters of a mol of a glycol, 1.5 grams of p-toluene sulfonic acid monohydrate and 300 ml. to 500 ml. of benzene are boiled under reflux for from 5 to 72 hours. A modified Dean-Stark tube is used to separate the water formed. The mixture is then cooled in an ice bath, and while stirring rapidly an excess of a basifying agent such as ammonium hydroxide, sodium bicarbonate, potassium carbonate, or dilute sodium hydroxide is added, followed by the addition of 200 ml. of water. The organic layer is separated, dried over anhydrous potassium carbonate and is filtered. The benzene is removed by distillation at partial vacuum and the residue is distilled if it is a liquid or recrystallized from a suitable solvent if it is a solid.

Representative of carbonyl compounds which may be converted to cyclic ketals for use in this invention are steroids such as substituted and unsubstituted cortisone, corticosterone, dehydrocorticosterone, desoxycorticosterone, progesterone, pregnenolone, testosterone, estrone, 19-nor-pregnenolone, and derivatives of these compounds.

Any suitable glycol may be used to convert the carbonyl group to a cyclic ketal. Representative glycols which have been found useful are ethylene glycol, 1,2-propylene glycol, 1,3-propylene glycol, 2,2-dimethyltrimethylene glycol, 1,2-butylene glycol, 1,3-butylene glycol, 2,3-butylene glycol, 2,4-amylene glycol, 4-methyl-1,2-amylene glycol, 5-methyl-1,3-hexylene glycol, 1,2-heptylene glycol, 3,4-heptylene glycol, 1,3-octylene glycol, etc.

The alkylene radical of the cyclic ketal is one which contains not more than 8 carbon atoms, the attaching oxygen to carbon bonds being separated by at least 2 and not more than 3 carbon atoms.

The cyclic ketal resulting from treatment of a carbonyl compound with a glycol under catalytic conditions is converted to a tertiary ether glycol by the following typical procedure:

0.1 mol cyclic ketal, 0.2 mol Grignard reagent in ether and 500 ml. benzene are distilled to remove the ether and raise the boiling point of the mixture to 78° C. The mixture is boiled for 16 hours under reflux, and then chilled. 100 ml. of 25% aqueous ammonium acetate is added cautiously and the organic layer is separated. The aqueous layer is re-extracted with ether and the extract is combined with the organic solution. The combined material is dried over potassium carbonate, concentrated and distilled or recrystallized, depending upon whether the resulting product is a liquid or a solid.

Any suitable Grignard reagent may be used to open the cyclic ketal group. Representative Grignard reagents are: alkyl Grignards such as methyl, ethyl, propyl, isopropyl, n-butyl, isobutyl, t-butyl, n-octyl, 2-methyl octyl, etc., aryl Grignards such as phenyl, tolyl, naphthyl, benzyl, mesityl, etc., and carbocyclic Grignards such as cyclohexyl, cyclopentyl, etc.

The following examples serve to illustrate, but are not intended to limit, the scope of the present invention.

EXAMPLE I

Preparation of pregnenolone-20-ethylene ketal 25 grams of pregnenolone, 750 ml. of ethylene glycol and 0.8 gram of p-toluene sulfonic acid monohydrate are stirred in a 1 liter flask attached to a vacuum-jacketed distillation column. The flask is heated in an oil bath at 115° C. while vacuum is applied to cause slow distillation at a vapor temperature of 82° C. Distillation is continued for 4½ hours with the accumulation of a deposit of crystals. The remaining glycol is then distilled rapidly by raising the temperature of the oil bath. The residue is cooled in an ice bath and 100 ml. of 3% methanolic potassium hydroxide is added with vigorous shaking. The crystals are collected on a filter, and washed with three 25 ml. portions of cold acetone. Additional ketal is obtained by diluting the filtrate with water. The solids are combined and recrystallized from ethyl acetate to obtain pregnenolone-20-ethylene ketal having a melting point of 167.5°–169.5° C. An infra-red absorption spectrum shows the complete absence of the 20-carbonyl.

EXAMPLE II

Preparation of pregnenolone-20-(1,2-propylene) ketal 25 grams of pregnenolone, 1.6 grams of p-toluene sulfonic acid, 50 ml. of 1,2-propylene glycol and 750 ml. of benzene are mixed and refluxed with stirring for 20 hours. A modified Dean-Stark tube is used to separate the water formed. The mixture is then cooled in an ice bath and 100 ml. of 3% methanolic potassium hydroxide is added. 100 ml. of water is added and the mixture is distilled under vacuum to remove the solvents. The solid residue is collected on a filter, washed with water and is dried. The residue is recrystallized from acetone to yield pregnenolone-20-(1,2-propylene) ketal having a melting point of 148.5°–149.5° C. An infra-red absorption spectrum shows the complete absence of the 20-carbonyl.

EXAMPLE III

*Preparation of 20-methyl-20-(2-hydroxyethoxy) pregn-5-en-3β-ol*

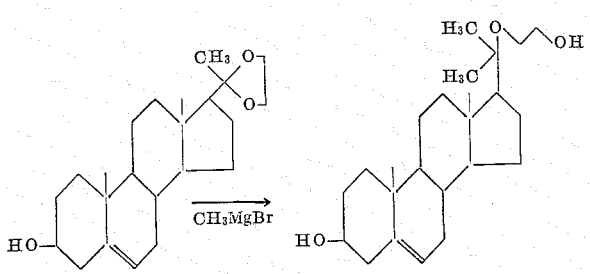

5 grams of pregnenolone-20-ethylene ketal and 500 ml. of benzene are placed in a three neck flask equipped with a stirrer and a modified Dean-Stark water trap and condenser and is refluxed until completely dry. The water trap is replaced by a condenser and 35 ml. of methyl magnesium bromide in ether (3 molar, 6 x excess) is added. The mixture is heated with stirring and refluxing for 3 hours. The flask is then cooled in an ice bath and 100 ml. of 25% aqueous ammonium acetate solution is added. The aqueous ammonium acetate is slowly added at first until the excess Grignard reagent is destroyed. A precipitate is formed, which precipitate is collected on a filter and washed with water and benzene. The filtrate is separated and the benzene layer is washed with water, dried with anhydrous magnesium sulfate and evaporated to dryness. The residue is then combined with the first precipitate, and recrystallized from 300 ml. of methylene chloride to yield 20-methyl-20-(2-hydroxyethoxy) pregn-5-en-3β-ol having a melting point of 190°–192° C.

Analyzed for $C_{24}H_{40}O_3$: Theoretical, C, 76.55; H, 10.71. Found, C, 76.41; H, 10.62. Optical rotation $\alpha_D^{20}$ pyridine, 44.2.

The diacetate is formed by reacting the above compound with acetic anhydride in pyridine to give a compound having a melting point of 77°–78° C.

Analyzed for $C_{28}H_{44}O_5$: Theoretical, C, 73.00; H, 9.63. Found, C, 73.11; H, 9.54.

EXAMPLE IV

*Preparation of 3ξ-methyl-3ξ-(2-hydroxyethoxy) cholestane*

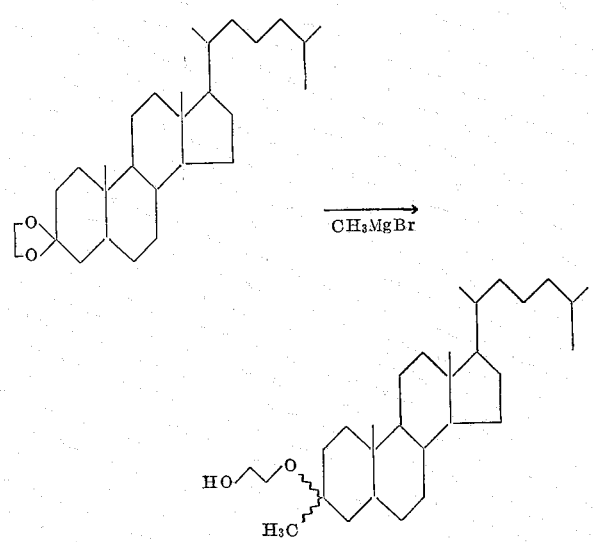

3 grams of cholestanone 3-ethylene ketal and 300 ml. of benzene are placed in a three neck flask equipped with a stirrer and a modified Dean-Stark water trap and is refluxed until dry. The water trap is replaced by a condenser and 30 ml. of 3 molar methyl magnesium bromide in ether is added. The mixture is refluxed for 16 hours, the vapor temperature being kept at 78° C. After refluxing, the mass is cooled to 5° C. and 100 ml. of 25% aqueous ammonium acetate solution is added. The benzene layer is separated and dried over anhydrous magnesium sulfate; it is then filtered and the benzene is removed at water pump vacuum.

The oil residue exhibits absorption in its infra-red spectrum at 2.88 mμ which is characteristic of hydroxyl, and at 9.00 to 9.50 mμ which is indicative of ether.

The oil residue is chromatographed on 100 grams of Woelm #1 alumina. 0.5% methanol in ether elutes a total of 3.14 grams of crystalline fractions all of which show the OH and C—O—C absorption in their infra-red spectra. The largest fraction of 1.55 grams is recrystallized twice in methanol to obtain 0.7 gram of 3ξ-methyl-3ξ-(2-hydroxyethoxy) cholestane having a melting point of 104.5°–105° C.

Analyzed for $C_{30}H_{50}O_2$: Theoretical, C, 80.65; H, 12.18. Found, C, 80.48; H, 12.16.

EXAMPLE V

*Preparation of 6β,20-dimethyl-20-(2-hydroxyethoxy)-pregnane-3β,5α-diol*

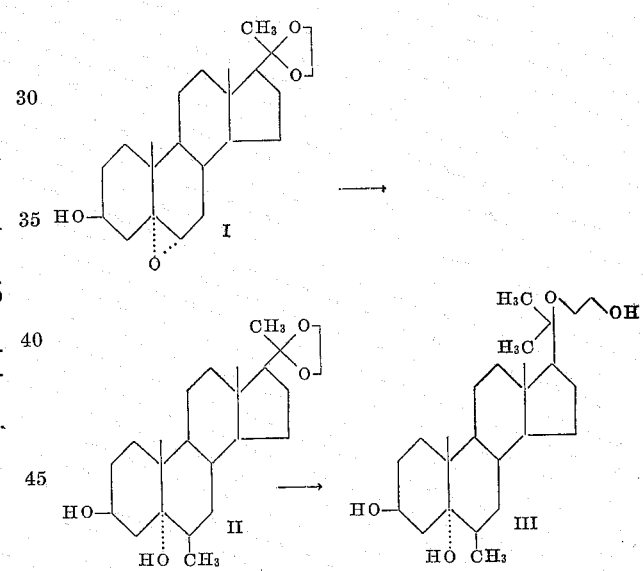

5 grams of 5,6-α,α-epoxy pregnan-3β-ol-20-one-ethylene ketal, 500 ml. of benzene and 37 ml. of 3 molar methyl magnesium bromide in ether are placed in a three neck flask equipped with a stirrer and a modified Dean-Stark water trap and is refluxed for 20 hours. The reaction mixture is cooled to 5° C. and is treated with 100 ml. of 10% acetic acid. The benzene layer is separated, dried over anhydrous magnesium sulfate and evaporated. The insoluble and aqueous portions are treated with additional acetic acid until acidic to Hydrion test paper. Both portions are then extracted with methylene chloride. The extracts are combined and washed with potassium bicarbonate solution, dried and evaporated.

The residue is dissolved in benzene and charged onto a chromatographic column containing 200 grams of silicic acid. The column is eluted with benzene containing increasing amounts of ethyl acetate.

From the 25–50% ethyl acetate eluted fraction is obtained 1.939 grams of material which on recrystallization from acetone yields 6β,20-dimethyl-20-(2-hydroxyethoxy)-pregnane-3β,5α-diol having a melting point of 185.5°–186.5° C. The infra-red spectrum of this material shows a broad strong hydroxyl absorption band peaking at 2.9 mμ and absorption in the 9.0–9.5 mμ region indicative of ether linkage. No absorption occurs in the region for epoxide or ketone.

Following procedures similar to those in Examples III, IV and V, the compounds set forth below are prepared.

(f) n-Butyl magneseium bromide yields 3ξ-n-butyl-3ξ-(1-methyl-3-hydroxybutoxy) cholestane.

| Example | Ketal Used | Grignard Reagent Used | Compound Formed | M.P., °C. | Formula | Analysis Theoretical | Carbon Hydrogen Found |
|---------|-----------|----------------------|-----------------|-----------|---------|---------------------|----------------------|
| VI | Pregnenolone-20-ethylene ketal. | Ethyl MgBr | 20-ethyl-20-(2-hydroxy ethoxy)-pregn-5-en-3β-ol. | 175–178 | $C_{25}H_{42}O_3$ | 76.87; 10.84 | 76.84; 10.88 |
| VII | Pregnenolone-20-(1,2-propylene) ketal. | Methyl MgBr | 20-(1-methyl-2-hydroxy ethoxy)-20-methyl pregn-5-en-3β-ol. | 213–216 | $C_{25}H_{42}O_3$ | 76.87; 10.84 | 76.96; 10.80 |
| VIII | Pregnenolone-20-(1,3-butylene) ketal. | ----do---- | 20-methyl-20(1-methyl-3-hydroxy propoxy)-pregn-5-en-3β-ol. | 217–220 | $C_{26}H_{44}O_3$ | 77.16; 10.96 | 77.16; 10.82 |
| IX | 17α-hydroxypregnenolone-20-ethylene ketal. | ----do---- | 20-methyl-20-(2-hydroxy ethoxy)pregn-5-ene-3β, 17α-diol. | 252–256 | $C_{24}H_{40}O_4$ | | |
| X | Pregnanolone-20-ethylene ketal. | ----do---- | 20-methyl-20-(2-hydroxy ethoxy)-pregnan-3β-ol. | 197.5–199.5 | $C_{24}H_{42}O_3$ | 76.14; 11.18 | 76.02; 10.92 |
| XI | Dehydroepiandrosterone ethylene ketal. | ----do---- | 17α-methyl-17β(2-hydroxy-ethoxy)-5-androsten-3β-ol. | 164–166 | $C_{22}H_{36}O_3$ | | |

EXAMPLE XII

In the same manner given in Example III reacting pregnenolone-20-ethylene ketal with:

(a) Phenyl magnesium bromide yields 20-phenyl-20-(2-hydroxyethoxy) pregn-5-en-3β-ol.

(b) Cyclopentyl magnesium iodide yields 20-cyclopentyl-20-(2-hydroxyethoxy) pregn-5-en-3β-ol.

(c) p-Methylbenzyl magnesium bromide yields 20-p-methylbenzyl-20-(2-hydroxyethoxy) pregn-5-en-3β-ol.

(d) Cyclohexylmagnesium chloride yields 20-cyclohexyl-20-(2-hydroxyethoxy) pregn-5-en-3β-ol.

EXAMPLE XIII

*Preparation of 3ξ-phenyl-3ξ-(2-hydroxyethoxy) cholestane*

3 grams of cholestanone 3-ethylene ketal and 500 ml. of benzene are placed in a three neck flask equipped with a stirrer and a modified Dean-Stark water trap and is refluxed until dry. The water trap is replaced by a condenser and 30 ml. of 3 molar phenyl magnesium bromide in ether is added. The mixture is refluxed for 20 hours, the vapor temperature being kept at 78° C. After refluxing, the mass is cooled to 5° C. and is treated with 100 ml. of 10% acetic acid. The benzene layer is separated and successively washed with water and aqueous sodium bicarbonate. The benzene layer is then dried over anhydrous magnesium sulfate and concentrated to 100 ml. The concentrated benzene layer is charged onto 150 grams of Woelm #1 neutral alumina and is eluted with pentane, benzene, ether and 0.5% methanol in ether.

The pentane elutes biphenyl and the benzene eluted unreacted ketal, both of which are identified by infra-red spectra.

The ether and 0.5% methanol in either elutes 3ξ-phenyl-3ξ-(2-hydroxyethoxy) cholestane which is identified by the characteristic infra-red absorption for hydroxyl, ethylene groups, ether and phenyl.

EXAMPLE XIV

Following the procedure of Example XIII, reacting cholestanone 3-(2,4-amylene) ketal with:

(a) Phenyl magnesium bromide yields 3ξ-phenyl-3ξ-(1-methyl-3-hydroxybutoxy) cholestane.

(b) Cyclopentyl magnesium iodide yields 3ξ-cyclopentyl-3ξ-(1-methyl-3-hydroxybutoxy) cholestane.

(c) m-Methylbenzyl bromide yields 3ξ-m-methylbenzyl-3ξ-(1-methyl-3-hydroxybutoxy) cholestane.

(d) Cyclohexyl magnesium chloride yields 3ξ-cyclohexyl-3ξ-(1-methyl-3- hydroxybutoxy) cholestane.

(e) Methyl magnesium bromide yields 3ξ-methyl-3ξ-(1-methyl-3-hydroxybutoxy) cholestane.

EXAMPLE XV

In the same manner as shown in Example III, reacting methyl magneseium bromide with:

(a) Cholestan-3β-ol-7-one ethylene ketal yields 7-methyl-7-(2-hydroxyethoxy)-cholestan-3β-ol.

(b) Estrone-3-methyl ether ethylene ketal yields 17α-methyl-17β-(2-hydroxyethoxy)-1,3,5-estratrien-3-methoxylate.

(c) 6α-methyl-5-pregnen-3β-ol-20-one ethylene ketal yields 6α-20-dimethyl-20-(2-hydroxyethoxy) - 5-pregnen-3β-ol.

(d) 19-norandrostan-17β-ol-3-one ethylene ketal yields 3ξ-methyl-3ξ-(2-hydroxyethoxy)-estran-17β-ol.

(e) Dehydroepiandrosterone ethylene ketal yields 17α-methyl -17β-(2-hydroxyethoxy)-5-androsten-3β-ol; and (f) 5α-pregnan-3,20-dione bis ethylene ketal yields 3,20-dimethyl-3,20-di-(2-hydroxyethoxy)-5α-pregnane.

EXAMPLE XVI

In the same manner as shown in Example III, reacting phenyl magnesium chloride with:

(a) Cholestan-3α-ol-7-one ethylene ketal yields 7-phenyl-7-(2-hydroxyethoxy)-cholestan-3α-ol.

(b) Estrone-3-methyl ether ethylene ketal yields 17α-phenyl-17β-(2-hydroxyethoxy)-1,3,5-estradien-3-methoxylate.

(c) 6α-methyl-5-pregnen-3β-ol-20-one ethylene ketal yields 6α-methyl-20-phenyl-20-(2-hydroxyethoxy)-5-pregnen-3β-ol.

(d) 19 - nordandrostan-17β-ol-3-one ethylene ketal yields 3ξ-phenyl-3ξ-(2-hydroxyethoxy)-estran-17β-ol.

(e) Dehydroepiandrosterone ethylene ketal yields 17α-phenyl-17β-(2-hydroxyethoxy)-5-androsten-3β-ol; and (f) 5α-pregnan-3,20-dione bis ethylene ketal yields 3,20-diphenyl-3,20-di-(2-hydroxyethoxy)-5α-pregnane.

What is claimed is:

1. 20-phenyl-20-(2-hydroxyethoxy) pregn-5-en-3β-ol.

2. 20-(1-methyl-2-hydroxyethoxy) - 20 - methyl-pregn-5-en-3β-ol.

3. 20-methyl-20-(1-methyl - 3-hydroxypropoxy) pregn-5-en-3β-ol.

4. 20-methyl-20-(2-hydroxyethoxy) - pregn-4-ene-3β,-17α-diol.

5. 20-methyl-20-(2-hydroxyethoxy)-pregnane-3β-ol.

6. 17α-methyl-17β-(2-hydroxyethoxy)-androst - 5 - en-3β-ol.

7. 6β,20-dimethyl-20-(2-hydroxyethoxy) pregnan-3β,-5α-diol.

8.

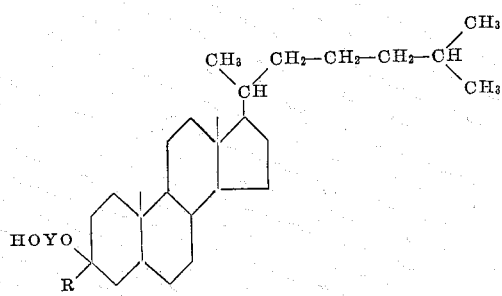

wherein R is selected from the group consisting of aryl, aralkyl, alkaryl and alicyclic, and Y is selected from the group consisting of alkylene radicals containing not more than 8 carbon atoms, the attaching oxygen to carbon bonds being separated by at least 2 and not more than 3 carbon atoms.

9. 3ξ-phenyl-3ξ-(2-hydroxyethoxy) cholestane.

References Cited by the Examiner

UNITED STATES PATENTS 3,081,315   3/1963   Bible _____ 260—397.1
3,193,563   7/1965   Cross _____ 260—397

OTHER REFERENCES

Davis: "J. Chem. Soc.," 1962, p. 178.

LEWIS GOTTS, *Primary Examiner.*

ELBERT L. ROBERTS, *Examiner.*